(12) United States Patent
Prevond et al.

(10) Patent No.: US 9,382,610 B2
(45) Date of Patent: *Jul. 5, 2016

(54) METHOD FOR MANUFACTURING A METAL ASSEMBLY

(75) Inventors: Laurent Prevond, Villeparisis (FR); Nicolas Collard, Rethel (FR); Renaud Caplain, Paris (FR); Pierre Francois, Montrouge (FR)

(73) Assignees: Centre National de la Recherche Scientifique (CNRS) (FR); CNAM—Conservatoire National Des Arts Et Metiers (FR); Ecole Normale Superieure De Cachan (FR)

( * ) Notice: Subject to any disclaimer, the term of this patent is extended or adjusted under 35 U.S.C. 154(b) by 698 days.

This patent is subject to a terminal disclaimer.

(21) Appl. No.: 13/634,021

(22) PCT Filed: Mar. 11, 2011

(86) PCT No.: PCT/EP2011/053749
§ 371 (c)(1),
(2), (4) Date: Sep. 11, 2012

(87) PCT Pub. No.: WO2011/110687
PCT Pub. Date: Sep. 15, 2011

(65) Prior Publication Data
US 2013/0061987 A1    Mar. 14, 2013

(30) Foreign Application Priority Data
Mar. 12, 2010 (FR) .................... 10 51808

(51) Int. Cl.
*B32B 15/01* (2006.01)
*C23C 8/10* (2006.01)
(Continued)

(52) U.S. Cl.
CPC . *C23C 8/80* (2013.01); *B21D 47/04* (2013.01); *B22F 7/04* (2013.01); *B23K 31/02* (2013.01);
(Continued)

(58) Field of Classification Search
CPC ............ C23C 8/80; C23C 8/10; B23K 31/02; B32B 15/04; B32B 15/012; B32B 15/016; B32B 15/017
See application file for complete search history.

(56) References Cited

U.S. PATENT DOCUMENTS 3,340,027 A      9/1967  Broverman et al.
2003/0108763 A1  6/2003  Palm
(Continued)

FOREIGN PATENT DOCUMENTS

EP    1468765 A1    10/2004
EP    1837103 A1    9/2007
WO    9410351 A1    5/1994

OTHER PUBLICATIONS

International Search Report for Application No. PCT/EP2011/053749 dated May 2, 2011.
(Continued)

*Primary Examiner* — Lois Zheng
(74) *Attorney, Agent, or Firm* — Lerner, David, Littenberg, Krumholz & Mentlik, LLP (57) ABSTRACT

The invention relates to a method for manufacturing an aluminum/metal assembly including the steps involving: thermally processing an aluminum sheet by heating said sheet to a temperature of between 80% and 100% of the melting temperature of the material of which it consists for a sufficiently long duration to create and stabilize by allotropic conversion an alpha alumina layer at the surface of said aluminum sheet, and then cooling same; providing a metal layer having a ductility less than or equal to the ductility of the aluminum sheet after cooling, said layer having surface irregularities having a depth greater than or equal to the thickness of the alpha alumina layer; and roll bonding the aluminum layer and the metal layer to produce the metal assembly.

14 Claims, 2 Drawing Sheets (51) Int. Cl.
| | |
|---|---|
| B23K 31/02 | (2006.01) |
| C23C 8/80 | (2006.01) |
| B21D 47/04 | (2006.01) |
| B22F 7/04 | (2006.01) |
| B32B 3/26 | (2006.01) |
| B32B 3/28 | (2006.01) |
| B32B 5/18 | (2006.01) |
| B32B 15/20 | (2006.01) |
| C22F 1/00 | (2006.01) |
| C22F 1/04 | (2006.01) |
| F28F 21/08 | (2006.01) |
| B32B 15/04 | (2006.01) |
| B22F 7/00 | (2006.01) |
| C22C 47/20 | (2006.01) |

(52) U.S. Cl.
CPC . *B32B 3/266* (2013.01); *B32B 3/28* (2013.01); *B32B 5/18* (2013.01); *B32B 15/012* (2013.01); *B32B 15/016* (2013.01); *B32B 15/017* (2013.01); *B32B 15/04* (2013.01); *B32B 15/20* (2013.01); *C22F 1/00* (2013.01); *C22F 1/04* (2013.01); *F28F 21/084* (2013.01); *B22F 7/004* (2013.01); *B22F 2999/00* (2013.01); *B32B 2457/18* (2013.01); *C22C 47/20* (2013.01); *F28F 2275/06* (2013.01); *Y10T 428/12479* (2015.01)

(56) References Cited

U.S. PATENT DOCUMENTS

| | | |
|---|---|---|
| 2005/0136256 A1 | 6/2005 | Vichniakov |
| 2006/0113353 A1 | 6/2006 | Zwickel et al. |
| 2008/0241582 A1 | 10/2008 | Groll |
| 2009/0166067 A1 | 7/2009 | Iwai et al. |

OTHER PUBLICATIONS

French Preliminary Search Report for Application No. FR 1051808 dated Oct. 14, 2010.

METHOD FOR MANUFACTURING A METAL ASSEMBLY

CROSS REFERENCE TO RELATED APPLICATIONS

The present application is a national phase entry under 35 U.S.C. §371 of International Application No. PCT/EP2011/053749, filed on Mar. 11, 2011, which claims priority from French Application No. 1051808, filed Mar. 12, 2010, the disclosures of which are incorporated by reference herein.

The invention concerns a method of manufacturing a metal assembly and an associated metal assembly.

More particularly, the invention concerns a method for obtaining an aluminium/metal assembly, that is to say comprising at least one layer of aluminium and one metal layer.

Aluminium is a malleable paramagnetic metal of low density, highly conductive and having remarkable oxidation resistance properties.

When it is oxidised with air, it very quickly forms on the surface a fine layer of alumina that protects it against the progression of the oxidation. This natural alumina layer has a thickness generally ranging from one to three micrometers.

Nevertheless, alumina is very insulating, unlike aluminium, and forms a barrier in particular preventing wetting of aluminium on another metal (especially on iron).

Some applications do however require materials having not only the properties of aluminium, in particular its conductivity, its low density, etc. but also additional properties such as magnetism, rupture strength and ability to be welded, which in particular steel or nickel may exhibit.

For example, in order to comply with antipollution standards aimed at reducing emissions of carbon dioxide into the atmosphere, automobile manufacturers envisage reducing the weight of the vehicles by replacing some steel components with components comprising aluminium, in particular by assembling steel sheets with aluminium sheets.

However, the manufacture of an assembly comprising aluminium and iron is very problematic since these materials are difficult to combine.

Typically, equilibrium diagrams show that aluminium alloys with ferromagnetic materials are possible. Nevertheless, these alloys are only able to form predetermined compounds that are mechanically fragile and paramagnetic.

More generally, the matrix of composites based on aluminium normally does not comprise more than 20% particles for reasons of homogeneity.

In another field, in order to increase the performances of engines or electrical generators with a rotor (a rotary machine) or solid mover (a linear machine), it is necessary to find a material having good electrical conductivity and ferromagnetic properties, while having a high mechanical strength to weight ratio.

Methods of manufacturing aluminium and iron alloys have therefore been proposed.

For example, the document FR 2 836 154 describes a method of manufacturing thin strips of aluminium/iron alloy, in which a continuous pouring between cylinders of an aluminium strip is carried out, this strip is homogenised for around ten hours at a temperature that is not too high, i.e. between 420° and 550° C., and this strip is rolled cold in several passes. It is possible also to carry out a relatively short intermediate annealing, from around one to four hours, at a temperature that is not too high in order to avoid enlargement of the grain, and a final annealing at a temperature between 200° C. and 430° C. for at least thirty hours.

However, in this document, the iron content must remain below 1.9% in order to avoid approaching the aluminium/iron eutectic content too closely, which gives rise to the appearance of coarse AlFe primary phases. The alloy obtained therefore does not have certain properties required of iron, such as magnetism.

The manufacture of metal assemblies comprising a sheet (or plate) of aluminium and a sheet (or plate) produced from another metal, in particular nickel, copper, cobalt or even aluminium, also interests manufacturers. For example, it is very difficult, without prior treatment, to spot weld an aluminium sheet with a metal sheet, which may pose problems in its use.

Numerous methods of manufacturing metal assemblies based on aluminium have been developed, but all have the drawback of being lengthy and difficult to implement, usually requiring specific equipment, and have a high energy cost.

One objective of the invention is therefore to propose a method of manufacturing a metal assembly, comprising at least one layer of aluminium and one metal layer, which is simpler and less lengthy to implement and of moderate energy cost.

Another objective of the application is to propose a method of manufacturing a metal assembly comprising at least one layer of aluminium and one metal layer and being able to be spot welded.

Another objective of the application is to propose a metal assembly comprising a layer of aluminium in which a metal layer is interpenetrated, and having a remarkable property such as a high mechanical strength to weight ratio, good thermal conductivity and good electrical conductivity, a high coefficient of magnetic permeability, high resistance to corrosion and delamination, and/or an extended range of use temperatures, etc.

For this purpose, the invention proposes a method of manufacturing an aluminium/metal assembly comprising the steps consisting of:

heat treating an aluminium sheet by raising it to a temperature between 80% and 100% of the melting point of the material constituting it for a sufficient period in order to create and stabilise an alpha alumina layer on the surface of said aluminium sheet by allotropic transformation, and then allowing it to cool again;

providing a metal layer having a ductility less than or equal to the ductility of the aluminium sheet after cooling, said layer having surface irregularities with a depth greater than or equal to the thickness of the layer of alpha alumina; and roll bonding the aluminium sheet and the metal layer in order to obtain the metal assembly.

Certain preferred but non-limitative aspects of the method according to the invention are as follows:

the roll bonding is carried out cold, the roll bonding is carried out in a single pass, the duration of the heat treatment of the aluminium sheet is between around twenty minutes and approximately two hours, the metal layer comprises metal powder and/or a metal sheet chosen from one of the elements in the following group: a grille, a lattice, a metal foam, a honeycomb structure, cables or a rough metal sheet, the metal layer comprises powder, and the method also comprises a step of dehydrating the powder prior to the roll bonding step, the metal sheet is a supplementary aluminium sheet, said method also comprising, prior to the step of roll bonding of the sheets, the following steps:

raising the supplementary aluminium sheet to a temperature of between 80% and 100% of the melting point of the material constituting it for a sufficient period to create and stabilise by allotropic transformation an alpha alumina layer on the surface of said aluminium sheet; and leaving the supplementary aluminium sheet to cool, the metal layer comprises a metal sheet, and the method also comprises the following steps prior to the roll bonding step:

heating the metal sheet to a temperature of between approximately 70% and 98% of the melting point of the metal constituting it for a given period according to the thickness of the sheet; and leaving the metal sheet to cool to ambient temperature, it also comprises a step during which the metal sheet is stripped between the cooling and roll bonding steps, it also comprises a step during which the metal sheet receives the surface treatment, the metal layer comprises at least one metal sheet, also comprising a step of assembling the aluminium (10, 10') and metal sheets prior to roll bonding thereof, it also comprises the following steps:

raising an additional aluminium sheet to a temperature of between 80% and 100% of the melting point of the material for a sufficient period to create and stabilise, by allotropic transformation, an alpha alumina layer on the surface of said additional aluminium sheet;

leaving the additional aluminium sheet to cool; and roll bonding the additional aluminium sheet with the metal assembly, the roll bonding of the additional aluminium sheet with the metal assembly is carried out simultaneously with or subsequently to the roll bonding of the aluminium sheet and the metal layer forming the assembly, and at least two metal assemblies are produced, and also comprising the following steps:

raising each metal assembly to a temperature of between 80% and 100% of the melting point of the material for a sufficient period to create and stabilise, by allotropic transformation, an alpha alumina layer on the surface of said additional aluminium sheet;

cooling each metal assembly to ambient temperature; and roll bonding the metal assemblies.

According to a second aspect the invention proposes a metal assembly obtained by the method according to the invention, comprising:

an aluminium sheet that has undergone the heat treatment step, and a metal layer applied against one surface of the aluminium sheet, the aluminium sheet interpenetrating surface irregularities (20) on the metal layer following the roll bonding step.

Some preferred but non-limitative aspects of the metal assembly according to the invention are as follows:

the metal layer comprises metal powder and/or a metal sheet chosen from one of the elements in the following group: a grille, a lattice, a metal foam, a honeycomb structure, cables or a rough metal sheet, the metal powder and/or the metal sheet is produced in one of the materials in the following group: steel, iron, nickel, cobalt, cubic metal with centred faces or alloys thereof, and the aluminium sheet is produced from pure aluminium or an aluminium alloy, the metal layer comprises a steel lattice, an aluminium sheet, a metal foam and/or metal powder, it also comprises an additional aluminium sheet on top of the metal layer.

According to a last aspect, the invention proposes a sandwich of metal sheets, comprising at least two metal assemblies according to the invention, and in which the aluminium sheet of a first of the metal assemblies interpenetrates surface irregularities both of the metal layer of said first assembly and of the metal sheet of the second of the metal assemblies.

Other features, aims and advantages of the present invention will emerge more clearly from a reading of the following detailed description with regard to the accompanying drawings given by way of non-limitative example and on which.

Figure 1A:
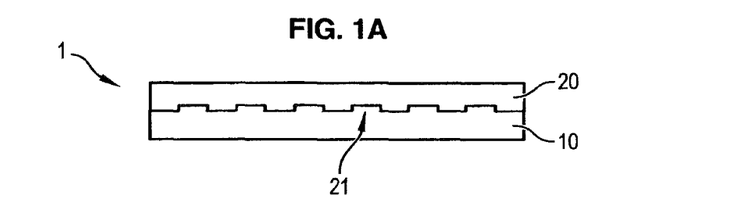
FIGS. 1A to 1C are views in section of example embodiments of metal assemblies according to the invention.
Figure 1B:
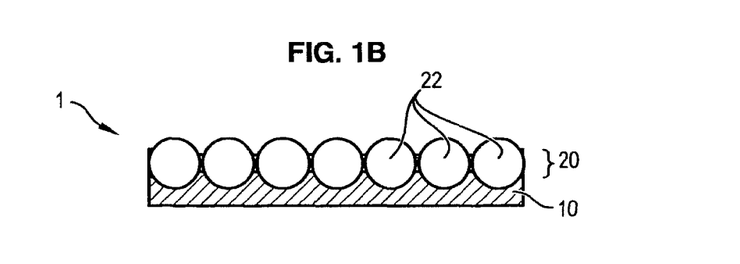
Figure 1C:
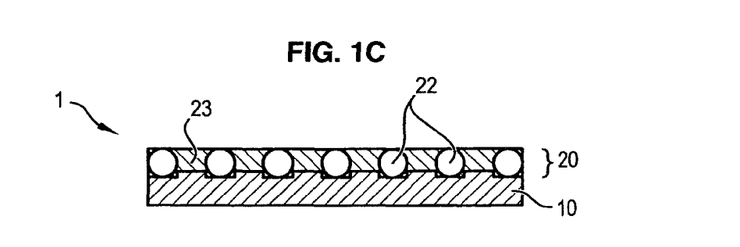
Figure 2A:
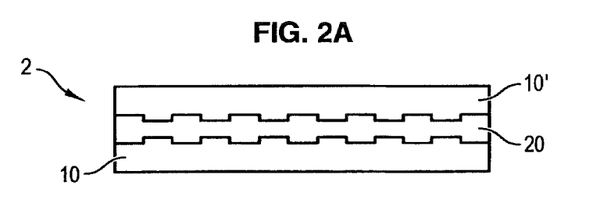
FIGS. 2A to 2D are views in section of example embodiments of sandwiches according to the invention.
Figure 2B:
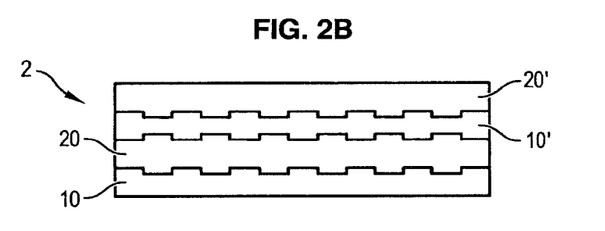
Figure 2C:
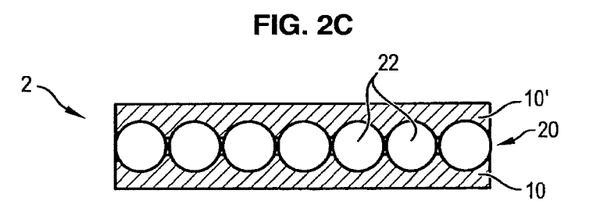
Figure 2D:
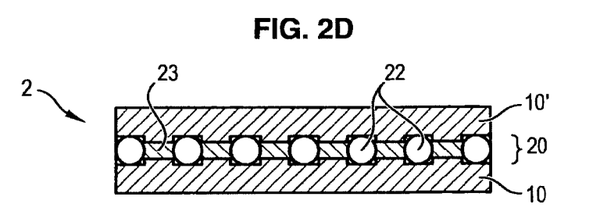

We shall first of all describe the general method of manufacturing a metal assembly comprising at least one layer of aluminium 10 and a metal layer 20 that are interpenetrated so as to form a coherent stack.

According to a first step, an allotropic transformation of the layer of oxide present on the surface of the aluminium layer 10 is effected.

For this purpose, the aluminium layer 10 is raised to a temperature between approximately 80% and 100% of the melting point of its constituent material for a sufficiently long period to stabilise said layer.

Preferably, the layer of aluminium 10 is heated to a temperature of between 93% and 98% of the melting point, more preferentially still to a temperature of around 95% (+/−1%).

The aluminium layer 10 is preferably an aluminium sheet.

Sheet means here a thin sheet (a few millimeters thick), a foil (a few microns thick), etc., or any substantially flat form that can be rolled.

The aluminium sheet 10 may moreover be produced from pure aluminium or an aluminium alloy.

Nevertheless, the invention is particularly suited to aluminium sheets that have good thermal conduction and can be raised to a uniform temperature throughout their volume. Typically, it may be an aluminium sheet produced from the series 1000 in the international classification system (A5 to A9, etc.).

For example, the aluminium sheet may be a food-quality aluminium paper with a thickness of between 5 and 20 microns heated between 500° C. and 660° C.

For these two examples of aluminium sheet 10, the duration of the heat treatment is then between around twenty minutes and approximately two hours, preferably around thirty minutes.

In the case of aluminium sheets 10 with greater thickness, typically 12 mm, the duration of the heat treatment is then preferably around 45 minutes.

Moreover, in a preferred embodiment, the aluminium sheet 10 is directly heat treated without previously having undergone a pre-rolling step. This is because such a pre-rolling could lead to primary or secondary recrystallisations of the aluminium and make its subsequent roll bonding more difficult.

In a second step, the aluminium sheet 10 is cooled.

It is necessary in fact to distinguish the time necessary for cooling the aluminium sheet 10 and the residence time at the stabilisation temperature of the aluminium layer, which must be considered to be essential. The cooling time and the final temperature after cooling are not in fact decisive characteristics per se, as long as the temperature of the aluminium sheet 10 is reduced sufficiently to allow "cold rolling" thereof (see further in the description).

It is in fact possible to leave the sheet 10 to cool slowly in the air or quickly (for example by quenching), without this having any influence on the result obtained.

The final cooling temperature may for example be the temperature of the room in which the method is implemented, typically around twenty degrees. It is however possible to cool the aluminium sheet 10 further (for example to zero degrees Celsius), or to cool it less (for example to around sixty degrees Celsius).

An aluminium sheet 10 is then obtained having a lower rupture strength than the aluminium sheet before heat treatment (between 15 and 20 MPa, instead of around sixty before heat treatment). The heat treatment in fact increases the grain size of the aluminium, thus facilitating subsequent working thereof.

Tests also showed that the aluminium sheets obtained following the heat treatment implemented in the first step of the method according to the invention had a wider range of use temperatures (between approximately −200° C. and +200° C., instead of −200° C. and +150° C. for the sheets alone) and became weldable (spot welding or other).

In a last step, the aluminium sheet 10 is roll bonded with the chosen metal sheet 20.

It is not necessary to implement the roll bonding immediately after the heat treatment of the aluminium sheet 1. For example, it is possible to allow a few hours or even a few weeks to elapse between the heat treatment and the roll bonding of the sheets.

The metal sheet 20 must have certain physical properties in order to be able to be used in the manufacturing method.

In particular, the metal layer 20 must have surface irregularities 21 of a size greater than or equal to the thickness of the alpha alumina layer created during the heat treatment of the aluminium sheet 10, i.e. typically around 5 microns.

It is important to note that the thickness of the alumina layer remains roughly constant, equal to 5 microns (to within 1-2 microns), whatever the thickness of the aluminium sheet 10, even if the heat treatment is continued beyond the duration necessary to stabilise it. Nevertheless, beyond a few hours (generally four hours), the heat treatment becomes a "homogenisation" treatment: the alpha alumina layer degrades and the grains constituting it are no longer in the same plane, so that its final thickness is modified and it exhibits black and green effects.

For example, the metal layer 20 may consist of a metal powder 22 that is spread on the aluminium sheet 10. Such a layer 20 then meets the requirements with regard to the surface irregularities 21 if its granulometry is greater than or equal to the thickness of the layer of alumina of the aluminium sheet 10.

The metal sheet 20 can also comprise a metal sheet 23.

For example, the metal sheet 23 may be a lattice (or in more general terms a grille), or a honeycomb structure, the surface irregularities 21 then being formed by the through or obstructed holes present in the sheet 20. Lattice means here a lattice produced in a single piece by cropping and drawing rolled metal, while grille means for example a sheet produced by weaving wires.

It may also be a metal foam the pores 21 of which are preferably open and have a diameter greater than or equal to 5 microns, or a metal sheet the surface roughnesses of which have a size greater than or equal to 5 microns.

Other types of metal sheet are of course usable, as long as the surface irregularities 21 are of a sufficiently great size. For example, it is possible to treat a metal sheet 20 with a smooth surface so as to make it sufficiently irregular to be able to be used in the invention, by brushing with steel wool, by sanding, by chemical treatment, etc.

In the remainder of this description, the term "metal sheet" will designate a thin metal plate, a metal lattice, a metal grille, a metal foam, a metal honeycomb structure, etc.

When the metal layer comprises such a metal sheet, said sheet may receive a surface treatment by wet or dry method in particular to increase the corrosion resistance of the sheet 20 as well as some of its physical characteristics, such as its electrical conductivity and its magnetic permeability, and to modify its coefficient of friction.

For example, it is possible to effect a deposition of nickel on a steel sheet 20 in order to increase the corrosion resistance thereof.

Whether it comprises metal powder 22 and/or one or more metal sheets 23, the metal layer 20 must also be less ductile than the aluminium sheet 10 after heat treatment so as to allow the interpenetration of the aluminium in the surface irregularities 21 of the metal layer 20 during the roll bonding step.

It may for example be produced from at least one of the materials comprising steel, iron, nickel, cobalt, a metal with a cubic crystallographic structure with centred faces (gold, copper, silver, etc.) or alloys thereof etc.

The roll bonding of the aluminium sheet 10 with the metal layer 20 can therefore be carried out hot or cold, in one or more passes. However, the inventors noted in this regard that roll bonding cold (i.e. at ambient temperature, without a new heating of the layers 10, 20, for example between approximately 0° C. and 60° C.) in a single pass made it possible to obtain much better results.

This is because, by making several passes, the assembly 1 formed by the aluminium sheet 10 and the metal sheet 20 risks delaminating, while, by making only one pass, the aluminium sheet 10 interpenetrates the grains and surface irregularities 21 of the metal layer 20 so as to form a coherent metal assembly 1.

The roll bonding can in particular be carried out at a speed of between 0.1 km/h and 3 km/h.

When the metal layer 20 comprises a metal sheet 23, it is possible to assemble the aluminium sheet 10 and the metal sheet 20 in order to prevent the metal assembly 1 deforming or drifting during roll bonding, for example by riveting the sheets 10 and 20, spot welding, pre-rolling of the assembly head 1, self-perforating screws, electron beam welding, or any conventional bonding or flanging system.

Contrary to the prejudices existing in the metallurgy field, spot welding of the sheets becomes in fact possible by virtue of the heat treatment undergone by the aluminium sheet 10, and more particularly because of the allotropic transformation and the stabilisation of the layer of oxide.

The alpha alumina layer also fulfils a role of lubricant during the roll bonding of the metal assembly 1 and substantially increases the corrosion resistance of the aluminium.

A metal assembly 1 is then obtained having remarkable properties such as increased resistance to corrosion and to tensile forces, a high mechanical strength to weight ratio, a more extensive use temperature range than that of pure aluminium (between approximately −200° C. and +200° C. for an aluminium/iron assembly), or conductivity similar to the conductivity of aluminium before heat treatment. The metal assembly 1 may also receive surface treatments, be stamped or shaped just like any other conventional metal sheet.

Thus, the metal assembly 1 obtained by means of the manufacturing method according to the invention makes it possible to reduce the mass of metal structure (or framework of any machine, in particular vehicles, whether it be in the automobile, aeronautic or space field).

It is also possible to reduce the mass of containers or other pressure tanks of constant use, or to increase the pressures of use for a constant container mass.

In the field of machines of the asynchronous type, it is also possible to increase the power density by a theoretical factor of 2 or even 3, and/or to reduce the mass of the machine by reducing the flux return magnetic circuits.

Moreover, the method has a low energy cost by virtue of the cold roll bonding step and the reduced duration of the heat treatment.

We shall now describe manufacturing methods according to the invention in more detail, taking examples of metal layers that can be used. The following examples are however in no way limitative and are given only by way of illustration.

It should also be noted that, whatever the example method described hereinafter, the heating, cooling and roll bonding steps remain the same as in the context of the general manufacturing method previously described. For a metal assembly 1 comprising an aluminium sheet 10 and metal powder 22, the method according to the invention can then also comprise an additional step of heat treatment of the metal powder 22 prior to the roll bonding step.

This is because tests have demonstrated that dehydration of the powders 22 improve the cohesion of the metal assembly 1 obtained, the specific surface of the elements constituting the powder 22 being greater than that of the aluminium and metal sheets. Thus the hydration level may become important with regard to the final result obtained, in particular when the assembly 1 is used at temperatures above 100° C., steam creating delamination points by local internal overpressure.

Generally, metal powders have around 15% water by weight, which may become a problem in particular during ageing treatments, the saturating steam causing delamination of the sheets.

For better results, it is therefore preferable to carry out the heat treatment of the metal powder 22 so that the degree of hydration thereof is sufficiently low (typically less than 1% surface water and bonded water) in order to reduce the saturating steam at the interfaces during roll bonding with the aluminium sheet 10.

The heating time, preferably under vacuum, depends once again on the density, the thermal capacity, the thermal conductivity and the thickness of the metal layer 20 of powder 22.

For example, in the case of a layer 20 of iron powder, the heat treatment lasts between approximately thirty minutes and two hours at 300° C., so as to completely dry the powder 22. Nevertheless, partial drying at 120° C. for around sixty minutes under vacuum may suffice for certain types of powder 22 that are not very hydrophilic.

For example, a dehydrated alumina powder generally comprises only 4% surface water and 10% bonded water. In this way, a simple heat pre-treatment sufficiently reduces its degree of hydration in order to obtain good results during roll bonding with the aluminium sheet 10 and limits the risks of delamination.

The layer 20 of metal powder 22 thus obtained is then roll bonded with the heat-treated aluminium sheet 10, preferably cold and in a single pass.

This step of roll bonding of the aluminium sheet 10 with the layer of metal powder 22 is preferably carried out consecutively with the dehydration of the powder 22, for example during the minutes that follow, in order to prevent moisture being taken up again in the powder 22. Where applicable, a further heat treatment is possible in order to once again dehydrate the powder 22.

Moreover, the quantity of powder 22 may be variable, according to the application desired. It is in fact possible to apply a very fine layer 20 of powder 22, a discontinuous layer 20 of powder 22, a complete layer 20, or even several thicknesses of powder. The result obtained then depends on the ratio between the granulometry and the powder 22 and the quantity of powder 22 applied. A very fine layer 20, having a minimum thickness of around five microns, will for example comprise atomised powder 22 having a ball effect that makes roll bonding difficult. On the other hand, a thick layer 20, which may be up to two millimeters thick, will for example comprise angular powder 22 that is easy to roll bond.

The metal assembly 1 thus obtained then has unexpected properties, in particular good mechanical characteristics compared with an aluminium sheet alone, and great stability over time.

Firstly the metal assembly 1 combines some of the properties particular to aluminium and to the metal constituting the powder 22 taken separately. Thus, in the case of an iron powder, it was found that the metal assembly 1 was ferromagnetic and was capable of attracting magnets and maintaining them in contact with its external surface, while having good electrical conductivity and low density.

Advantageously, the use of powder 22 makes it possible to have a good distribution of the material constituting it in the final metal assembly 1, without for all that having a substantial impact on its global density.

In this way, it becomes possible to use the aluminium/iron metal assembly 1 obtained according to the method of the invention in order to produce flexible electromagnetic shielding, lightweight and mechanically strong, according to the thicknesses chosen for the aluminium sheets 10 and the metal layer 20.

For a metal assembly 1 comprising an aluminium sheet 10 and a steel sheet 20, the method may also comprise a supplementary step of heating the steel sheet 20 to a temperature of between 70% and 98% of its melting point, for example 1100° C., for a period depending on the thickness of the sheet 20, typically for 30 minutes for a sheet 20 one millimeter thick.

The heating time depends on the density, the thermal capacity, the thermal conductivity and the thickness of the steel sheet 20.

In this example embodiment, the aluminium sheet 10 is produced from a series 1000 alloy and the steel sheet 20 is a lightly alloyed XC10 steel sheet.

The steel is then cooled to the cooling temperature of the aluminium sheet. Once again, as for the aluminium sheet 10, the duration of the cooling and the final temperature of the cooled steel are not decisive parameters.

The steel sheet 20 is then stripped mechanically or chemically so as to remove the layer of oxides present on the surface that could prevent the formation of a coherent metal assembly 1.

According to one embodiment, the stripping is carried out by sandblasting. Given that the surface of the metal sheet 20 must not be regular, the granulometry of the sandblasting is not important. On the other hand, the pressure of the sandblasting must be controlled in order to prevent intrusions of abrasive grains in the metal.

In a variant, the stripping is carried out by acid attack (for example with hydrochloric acid), by brushing with steel wool, or any other known technique.

The steel sheet 23 thus obtained is then roll bonded with the thermally treated aluminium sheet 10, preferably cold and in a single pass.

The metal assembly 1 thus obtained then has unexpected properties.

This is because the metal assembly 1 combines some of the properties particular to aluminium and steel taken separately. Thus, it was found that the metal assembly 1 was ferromagnetic and was capable of attracting magnets and maintaining them in contact with its external surface, while having good electrical conductivity and low density.

For example, for a metal assembly 1 comprising a food-quality aluminium paper of grade A5 and a nickel lattice 23 approximately 1 mm thick, the relative magnetic permeability of the assembly is around 300, its conductivity is close to that of aluminium (around $4.6 \times 10^{+8}$ ohms$^{-1}$.m$^{-1}$), its mechanical tensile strength is around 10 MPa (which is important for a sheet 10 of such low thickness, approximately 100 microns), whilst its density is around 4.7.

In this way it becomes possible to use the aluminium/nickel metal assembly 1 obtained according to the method of the invention in order to produce flexible electromagnetic shielding, lightweight and mechanically strong, according to the thicknesses chosen for the aluminium 10 and metal 23 sheets.

In addition, the assembly 1 may undergo successive roll bonding making it possible to mechanically increase the number of layers from a single initial assembly. This multilayer then has characteristics even superior to the initial assembly in particular in terms of mechanical strength (traction/tearing) and magnetic resistance through better distribution through the thickness.

Moreover, in the example embodiment where the metal sheet 20 is made from steel, it is possible to use only a rolling mill with two cylinders instead of a rolling mill with four cylinders, since the assembly 1 remains sufficiently aligned during rolling.

Moreover, tests carried out on such a metal assembly 1 showed that it resisted corrosion and delamination in a saturating steam phase environment at 210° C. for 12 hours. Likewise, the assemblies obtained resisted temperatures of 77K (approximately −196° C.) without delaminating.

Tests also showed that the aluminium sheets obtained following the heat treatment implemented in the first step of the method according to the invention had a wider range of use temperatures (between approximately −200° C. and +200° C., instead of −200° C. and +150° C. for the sheets alone.

It should be noted however that the heat treatment of the metal sheet 23 is not necessary for all materials. Its purpose is to mechanically soften the material constituting it.

For example, in the context of the manufacture of a metal assembly 1 formed by an aluminium sheet 10 interpenetrating a sheet 23 of nickel, copper, gold or any other cubic material with centred faces, the step of heating the metal sheet 23 is optional, as well as the surface stripping thereof.

In a variant, the method according to the invention also makes it possible to produce an assembly formed by two aluminium sheets 10, 10' that penetrate each other. The metal sheet 20 is therefore here a supplementary aluminium sheet.

By virtue of this embodiment, it therefore becomes possible to weld together two aluminium sheets 10, 10', which could not be envisaged according to the conventional welding techniques, in particular because of the barrier formed by the layer of alumina.

For this purpose, the method of manufacturing a metal assembly 1 of two aluminium sheets comprises simply a supplementary step of heating and cooling the supplementary aluminium sheet 10' compared with the general method according to the invention, the metal sheet here being the supplementary aluminium sheet.

More precisely, the two aluminium sheets are heat treated, simultaneously or successively, and then cooled, in accordance with the first two steps (heating and then cooling) of the general method previously detailed.

It should be noted that an aluminium sheet 10' identical or similar to the first aluminium sheet does indeed meet the requirements for being roll bonded with the aluminium sheet 10. This is because the heat treatment firstly creates and stabilises on the surface an alpha alumina layer having a roughness approximately 5 microns thick (and therefore a sufficiently irregular surface) and secondly makes the sheet substantially as ductile as the first aluminium sheet.

It is therefore possible to colaminate the two aluminium sheets 10, 10', preferably cold and in a single pass, so as to obtain a metal assembly 1 comprising two aluminium sheets that penetrate each other.

This aluminium assembly 1 has in particular enhanced mechanical characteristics and the same properties as each aluminium sheet taken separately following its respective heat treatment. In particular, it has enhanced corrosion resistance (in particular in 68% nitric acid), can be spot welded, used in a wider range of temperatures, etc.

According to a second embodiment, the metal layer 20 comprises both a metal sheet 23 and metal powder 22.

The method according to the invention then comprises, in addition to the steps of the general method described above, both the steps relating to the use of the powder 22 (partial or total dehydration of the powder, according to its initial degree of hydration) and, where applicable, the steps relating to the use of the sheet 23 (heat treatment and/or stripping, according to the type of metal used).

The layer of powder 22 is then advantageously placed between the aluminium sheet 10 and the metal sheet 23.

According to a first embodiment, the metal assembly 1 is obtained by simultaneous roll bonding of the aluminium sheet 10 with the layer of powder 22 and the metal sheet 23. Once again, the roll bonding is preferably carried out in a single pass and cold.

According to a second embodiment, the roll bonding is carried out in two stages. Firstly, the aluminium sheet 10 is roll bonded with the layer of powder 22. An aluminium/powder base assembly is then obtained. Secondly, the aluminium/powder assembly is heat treated according to the first two steps of the invention, and then roll bonded with the metal sheet 20 in order to obtain the final metal assembly 1.

The heat treatment of the aluminium/powder base assembly once again increases the size of the aluminium grain, thus facilitating subsequent work thereon, and dehydrates the incrusted powder in order to reduce the saturating steam at the interfaces during roll bonding with the metal sheet 20 and therefore reduces the risks of delamination.

In a variant, an aluminium/sheet base assembly is first of all produced, which is then roll bonded after heat treatments of the base assembly and powder 22 with the layer of powder.

The final metal assembly 1 then has both the characteristics of aluminium and the characteristics of the metals used for the powder 22 and sheet 23.

For example, for a metal assembly comprising a sheet of 0.8 mm produced from grade A5 aluminium, a steel lattice 23 approximately 0.8 mm thick and a layer of powder 22 with a thickness of 2 mm, the relative magnetic permeability of the final assembly 1 is around 100, and its conductivity is close to that of aluminium (around $4.6 \times 10^{-8}$ ohms$^{-1}$.mm$^{-1}$).

This metal assembly 1 has the particularity of comprising a sheet of aluminium that interpenetrates the two metal layers 20: by filling some of the holes in the lattice 23, the metal powder 22 can then make the assembly very magnetic since it centralises a large quantity of powder 22 over a small surface.

Moreover, the metal assemblies thus obtained according to the method of the invention can serve as a basis for manufacturing new assemblies, by roll bonding with an additional metal layer. These new assemblies will hereinafter be referred to as sandwiches 2, in order to distinguish them from the aluminium/metal assemblies previously described.

According to a first embodiment, it is possible to weld an additional aluminium sheet 10' to a metal assembly 1 obtained according to the method previously described in order to obtain a metal sandwich 2.

For this purpose, the additional aluminium sheet 10' and the assembly 1 already obtained are heated and cooled, in accordance with the first two steps of the method of the invention, and then the additional aluminium sheet 10' is roll bonded with the metal assembly 1, preferably cold and in a single pass.

In a variant, the sandwich 2 is produced from the outset, after heat treatment of the sheets 10, 10', by roll bonding simultaneously the two aluminium sheets 10, 10' and the metal layer 20 (powder 22 and/or metal sheet or sheets), without the intermediate step of manufacturing the assembly 1.

For this purpose, the aluminium sheets 10, 10' are heat treated in accordance with the first two steps of the method according to the invention.

The metal powder 22, and/or where applicable the metal sheet 23 (in the case for example of a steel lattice), are also heat treated in order to dehydrate it or them.

Then the sheet 23 and powder 22 are roll bonded between the two aluminium sheets 10, 10', preferably cold and in a single pass.

In a variant, following the heat treatment of the aluminium sheets 10 and 10', the first aluminium sheet 10 is first of all roll bonded with the sheet 23 and a second sheet 10' with the powder 22, in order to obtain an aluminium/powder assembly 1 and an aluminium/sheet assembly 1 respectively. It then suffices to re-treat the two assemblies thermally at a temperature of between 80% and 100% of the melting point of the aluminium sheet 10, 10' for several minutes, for example around thirty minutes, and to re-cool them, in accordance with the first two steps of the general method described above, and then to roll bond them in order to obtain the sandwich 2 comprising the two aluminium sheets 10, 10' enclosing the sheet 23 and powder 22.

For example, for a metal sandwich 2 comprising two grade A5 aluminium sheets 0.8 mm thick (10) and (10') enclosing an XC10 steel lattice 0.8 mm thick 23 and nickel powder 22, the sandwich obtained has a thickness of approximately 0.8 mm, a relative magnetic permeability of approximately 100, a density of around 3.2 and an electrical conductivity of approximately $4.4 \times 10^{+8}$ ohms$^{-1}$.m$^{-1}$.

By reiterating these heating, cooling and roll bonding steps (or by directly roll bonding all the layers 10, 10', 20, 20' of the sandwich, after the respective heat treatments thereof), it is thus possible to obtain sandwiches 2 comprising more than one aluminium layer 10 and one metal layer 20. The number of layers 10, 10', 20, 20' and the choice of metal layers 20, 20' (each comprising metal powder 22 and/or one (or more) metal sheets (23, 23') naturally depend on the properties required for the sandwich 2 and improve the tensile strength of the sandwich (for example the rupture strength of an aluminium/iron assembly is approximately three times greater than that of aluminium alone), typically 50 to 150 MPa. Advantageously, the sandwiches 2 comprising two aluminium sheets 10, 10' enclosing a steel sheet 20 has surprising corrosion resistance properties and high resistance to delamination. Thus the immersion of such a sandwich 2 in a bath of liquid nitrogen at 77K (−196° C.) showed that the sandwich 2 remained coherent despite the different coefficients of expansion of aluminium and steel.

Moreover, the sandwich 2 according to the invention is capable of withstanding a 68% concentrated nitric acid attack for several days. Only the metal sheet 20 is attacked if the edges of the sandwich 2 are not protected, that is to say if the metal layer 20 enclosed by the aluminium sheets 10, 10' is in contact with the acid.

The impermeability of the metal central part 20 of the sandwich 2 is on the other hand easier to obtain when the metal sheet 20 comprises powder 22. It suffices in fact not to put powder 22 on the edges of the aluminium sheets 10, 10' during roll bonding. Then any delamination by oxidation of the metal central part 20 is avoided.

The sandwiches may also be produced with several different types of metal sheet and/or metal powder, in order to combine certain properties of interest. For example, the welding by the method according to the invention of a metal assembly 1 comprising powder 22 and/or a steel lattice with a metal assembly 1 comprising a lattice 23 and/or nickel powder 22 makes it possible to obtain a sandwich comprising at the same time aluminium, steel and nickel, in order to adapt the conductivity, magnetic permeability and density, for example to the desired application.

Advantageously, the method according to the invention makes it possible to obtain metal assemblies 1 and sandwiches 2 of metal layers 20 that could easily be recovered by fusion. This is because it is possible to separate and recover by gravity the component of the metal assembly 1 having the lowest melting point. In the case of a mixed sandwich, comprising more than one different material for the metal sheets, it then suffices to repeat the operation until there remains only one type of material.

The invention claimed is:

1. A method of manufacturing a metal assembly comprising the steps:
   heat treating an aluminum sheet by raising the aluminum sheet to a temperature between 80% and 100% of the melting point of a material constituting the aluminum sheet for a sufficient period to create and stabilize an alpha alumina layer on a surface of said aluminum sheet by allotropic transformation, and then allowing the aluminum sheet to cool again;
   providing a metal layer having a ductility less than or equal to the ductility of the aluminum sheet after cooling, said layer having surface irregularities with a depth greater than or equal to the thickness of the layer of alpha alumina; and
   roll bonding the aluminum sheet and the metal layer so that the aluminum sheet interpenetrates the surface irregularities of the metal layer to obtain the metal assembly.

2. The method according to claim 1, wherein the roll bonding is carried out cold.

3. The method according to claim 1, wherein the roll bonding is carried out in a single pass.

4. The method according to claim 1, wherein the duration of the heat treatment of the aluminum sheet is between about twenty minutes and approximately two hours.

5. The method according to claim 1, wherein the metal layer comprises metal powder and/or a metal sheet selected from the group consisting of a grille, a lattice, a metal foam, a honeycomb structure, cables and a rough metal sheet.

6. The method according to claim 5, wherein the metal layer comprises powder, and the method also comprises a step of dehydrating the powder prior to the roll bonding step.

7. The method according to claim 5, wherein the metal sheet is a supplementary aluminum sheet, said method also comprising, prior to the step of roll bonding, the following steps:
  raising the supplementary aluminum sheet to a temperature of between 80% and 100% of the melting point of a material constituting the supplementary aluminum sheet for a sufficient period to create and stabilize by allotropic transformation an alpha alumina layer on a surface of said supplementary aluminum sheet; and
  leaving the supplementary aluminum sheet to cool.

8. The method according to claim 5, wherein the metal layer comprises a metal sheet, and the method also comprises the following steps prior to the roll bonding step:
  heating the metal sheet to a temperature of between approximately 70% and 98% of the melting point of a metal constituting the metal sheet for a given period according to the thickness of the metal sheet; and
  leaving the metal sheet to cool to ambient temperature.

9. The method according to claim 8, also comprising a step during which the metal sheet is stripped between the cooling and roll bonding steps.

10. The method according to claim 5, also comprising a step during which the metal sheet receives a surface treatment.

11. The method according to claim 5, wherein the metal layer comprises at least one metal sheet, also comprising a step of assembling the aluminum and the metal sheets prior to roll bonding thereof.

12. The method according to claim 1, also comprising the following steps:
  raising an additional aluminum sheet to a temperature of between 80% and 100% of the melting point of a material constitute said additional aluminum sheet for a sufficient period to create and stabilize, by allotropic transformation, an alpha alumina layer on the surface of said additional aluminum sheet;
  leaving the additional aluminum sheet to cool; and
  roll bonding the additional aluminum sheet with the metal assembly.

13. The method according to claim 12, wherein the roll bonding of the additional aluminum sheet with the metal assembly is carried out simultaneously with or subsequently to the roll bonding of the aluminum sheet and the metal layer forming the metal assembly.

14. The method according to claim 1, wherein at least two metal assemblies are produced, and additionally comprising the following steps:
  raising each metal assembly to a temperature of between 80% and 100% of the melting point of a material constituting the aluminum sheet for a sufficient period to create and stabilize, by allotropic transformation, an alpha alumina layer on a surface of said aluminum sheet;
  cooling each metal assembly to ambient temperature; and
  roll bonding the metal assemblies.

* * * * *